US007454546B1

(12) United States Patent
Lilley

(10) Patent No.: US 7,454,546 B1
(45) Date of Patent: Nov. 18, 2008

(54) ARCHITECTURE FOR DYNAMICALLY REPROGRAMMABLE ARBITRATION USING MEMORY

(75) Inventor: Jennifer R. Lilley, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 57 days.

(21) Appl. No.: 11/341,003

(22) Filed: Jan. 27, 2006

(51) Int. Cl.
*G06F 13/14* (2006.01)
(52) U.S. Cl. ...................... 710/243; 710/117
(58) Field of Classification Search ......... 710/112–113, 710/116–117, 240–244
See application file for complete search history.

(56) References Cited

U.S. PATENT DOCUMENTS 5,481,680 A * 1/1996 Larson et al. ............... 710/112
5,822,758 A * 10/1998 Loper et al. ................ 711/130
6,985,985 B2 * 1/2006 Moss ......................... 710/240

OTHER PUBLICATIONS

Xilinx, Inc., "High Performance Multi-Port Memory Controller", Application Note,, XAPP535, Dec. 10, 2004, pp. 1-190, v1.1, available from Xilinx, Inc., 2100 Logic Drive, San Jose, CA 95124.

* cited by examiner

*Primary Examiner*—Clifford H Knoll
(74) *Attorney, Agent, or Firm*—Thomas A. Ward; Kevin T. Cuenot

(57) ABSTRACT

An architecture for a Block RAM (BRAM) based arbiter is provided to enable a programmable logic device (PLD) to efficiently form a memory controller, or other device requiring arbitration. The PLD arbiter provides low latency with a high clock frequency, even when implementing complex arbitration, by using BRAM to minimize PLD resources required. The architecture allows multiple complex arbitration algorithms to be used by allowing the multiple algorithms to be stored in BRAM. With multiple algorithms, dynamic configurability of the arbitration can be provided without halting the arbiter by simply changing an algorithm stored in BRAM. Additionally, algorithms can by dynamically modified by writing to the BRAM. With BRAM memory used for arbitration, PLD resources that would otherwise be wasted are frees up to be used by other components of the system.

20 Claims, 6 Drawing Sheets

ARCHITECTURE FOR DYNAMICALLY REPROGRAMMABLE ARBITRATION USING MEMORY

BACKGROUND

1. Technical Field

Embodiments of the present invention relate to an arbiter that can be used in a programmable logic device (PLD).

2. Related Art

Arbiters are typically implemented using logic of one type of PLD, a Field Programmable Gate Array (FPGA). As a non-limiting example of an arbiter, an FPGA can serve as a multi-port memory controller (MPMC) to control access to a DRAM memory from multiple devices. If processing or intelligence is used in the arbiter, such as a state machine based arbiter, the arbiter can become large very quickly. The intelligence of the arbiter made using components such as look up tables (LUTs) of the FPGA will grow in proportion to the amount of intelligence required. Increasing the resources used can adversely affect the maximum clock frequency the arbiter can operate if pipeline stages are not added. If pipeline states are added, the system performance, particularly latency, will be degraded.

An FPGA is an integrated circuit chip that includes components such as programmable input/output buffers (IOBs), configurable logic blocks (CLBs), block random access memory (BRAMs) and a programmable interconnect circuitry for interconnecting the IOBs, CLBs and BRAMs. The CLBs each include multiple LUTs that can be programmed to form logic elements such as AND, OR and XOR gates. The FPGAs further include SRAM configuration memory cells that can be programmed to configure the logic in the IOBs, CLBs and BRAMs. The SRAM configuration memory cells are typically programmed at startup of the FPGA, but can be reprogrammed using a partial reconfiguration process during operation of the FPGA by programming frames or a number of columns of the SRAM memory cells at a time.

It is desirable to efficiently use the components of a PLD, such as an FPGA, to develop an arbiter that can allow for complex arbitration algorithms, while still taking advantage of the dynamic reconfiguration abilities of the PLD and while maintaining low latency.

SUMMARY

According to embodiments of the present invention, an arbiter is implemented using a BRAM of a PLD. Use of BRAM provides for (1) use of minimal logic resources of the FPGA, (2) provision of multiple concurrently operating arbitration schemes in the BRAM, (3) dynamic selection between arbitration schemes, (4) dynamic programmability of arbitration schemes, and (5) operation of the arbitration system at a different frequency rate than the remainder of the PLD.

BRIEF DESCRIPTION OF THE DRAWINGS

Further details of the present invention are explained with the help of the attached drawings in which.

DETAILED DESCRIPTION

Use of BRAMs allows for efficient use of PLD resources to provide a memory controller with at least the five benefits described in the above summary. First, because most PLD based systems will not use all of the BRAMs in a given PLD, the BRAM is free logic. Use of BRAM for arbitration, thus, frees logic resources that would have gone into implementing the arbiter for other uses. By using BRAM to minimize PLD resources required, the PLD arbiter provides low latency with a high clock frequency, even when implementing complex arbitration.

Second, BRAMs allow for implementation of multiple arbitration schemes. BRAMs are large, some occupying 18 kilobytes like the Virtex-4 FPGA made by Xilinx, Inc. of San Jose, Calif. This means that if the BRAM is used to hold the arbiter sequencing scheme and 36 outputs are desired, there can be up to 512 sequences in the arbitration scheme. This is far more sequences than typically used for one arbiter, opening up the possibility of storing several arbitration schemes in the BRAM. A BRAM address can be used to select which one of the several arbitration schemes to use at a given time. For example a BRAM can have 36 outputs and 32 arbitration schemes of 16 sequences each.

Third, dynamic selection between arbitration schemes can be provided. Software or hardware can make optimizing assumptions to pick which arbitration scheme is most useful at a particular point in time. Not only can different algorithms be selected, but also the algorithms could be dynamically modified by either hardware or software. This is aided by the fact that BRAMs can be dual ported, so arbitration does not need to halt while the algorithm is modified.

Fourth, the architecture of embodiments of the present invention allows the arbiter to run asynchronously from the rest of the system. The dual ported nature of the BRAM allows the sequencer to run at a different frequency from the block that modifies the arbitration algorithm. Additionally, the architecture allows for the rest of the system to run at a different rate than the arbiter.

Figure 1:
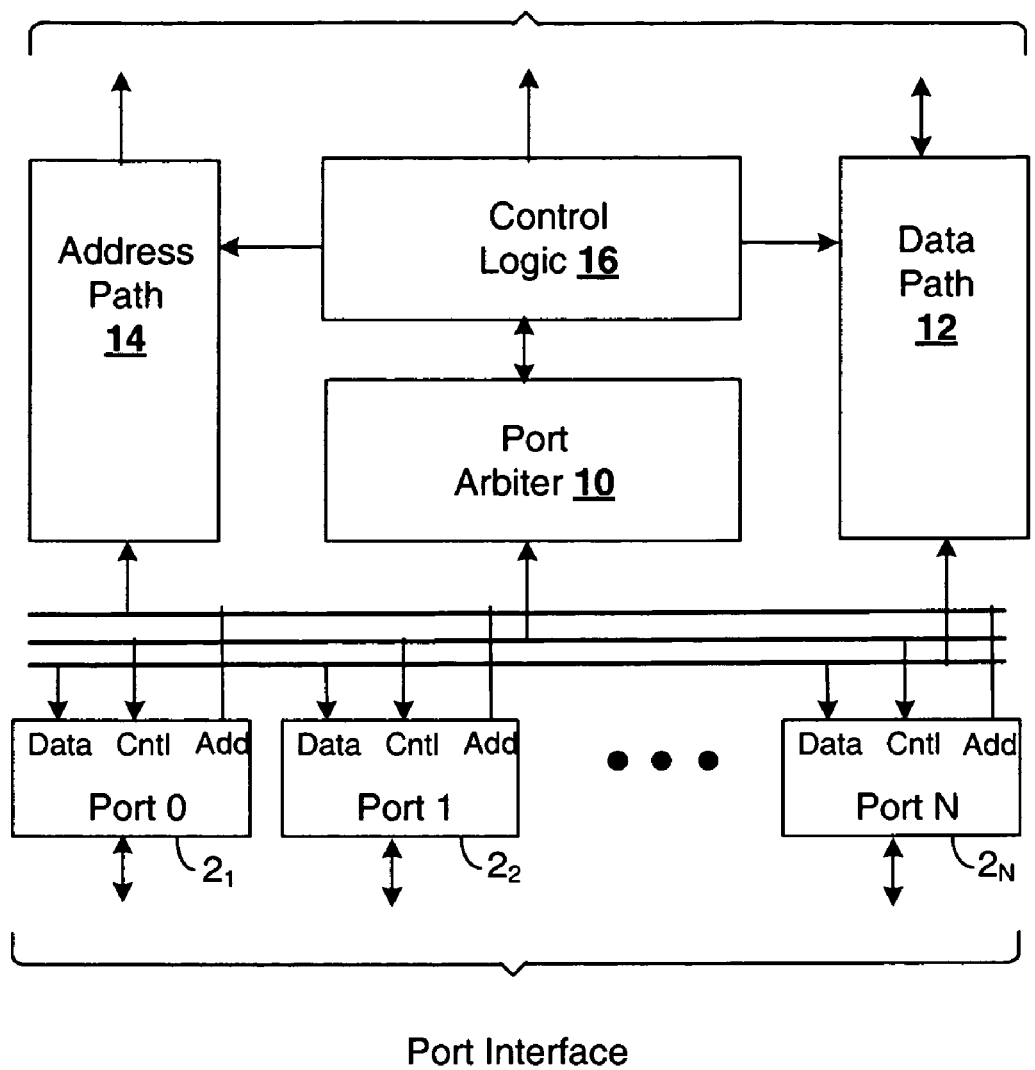
FIG. 1 shows a block diagram of a port arbiter that can be BRAM based according to embodiments of the present invention.

FIG. 1 shows a block diagram of components of an arbiter that can include a BRAM based arbiter according to embodiments of the present invention. The arbiter determines which of a number of ports may gain access to an external controller. Input ports $2_1$-$2_N$ are show for illustration to connect to N requesting devices.

Signals are provided between the ports $2_1$-$2_N$ and a port arbiter 10, a data path 12, and an address path 14. Requests are provided from the ports $2_1$-$2_N$ to the port arbiter 10, and acknowledgement signals are provided back from the port arbiter 10 using control logic 16 to individual ones of the ports $2_1$-$2_N$ granted access to transmit data. The port arbiter 10 will accept requests during each time slot from one or more of the ports $2_1$-$2_N$ and will grant access to individual ports according to one or more desired arbitration schemes.

Once granted access, one of the ports $2_1$-$2_N$ will transmit data through the data path 12 as addressed by signals provided by the ports over the address path 14. Data can also be read from an external device by signals provided from the ports through the data path 12 as addressed using path 14. The arbiter 10 will monitor the data path 12 and address path 14 to determine when the paths are clear for sending additional data. The control logic 16 receives signals from the arbiter 10 and provides the port acknowledgement signals as well as status indications, such as when the port may start transmission of data signals.

Figure 2:
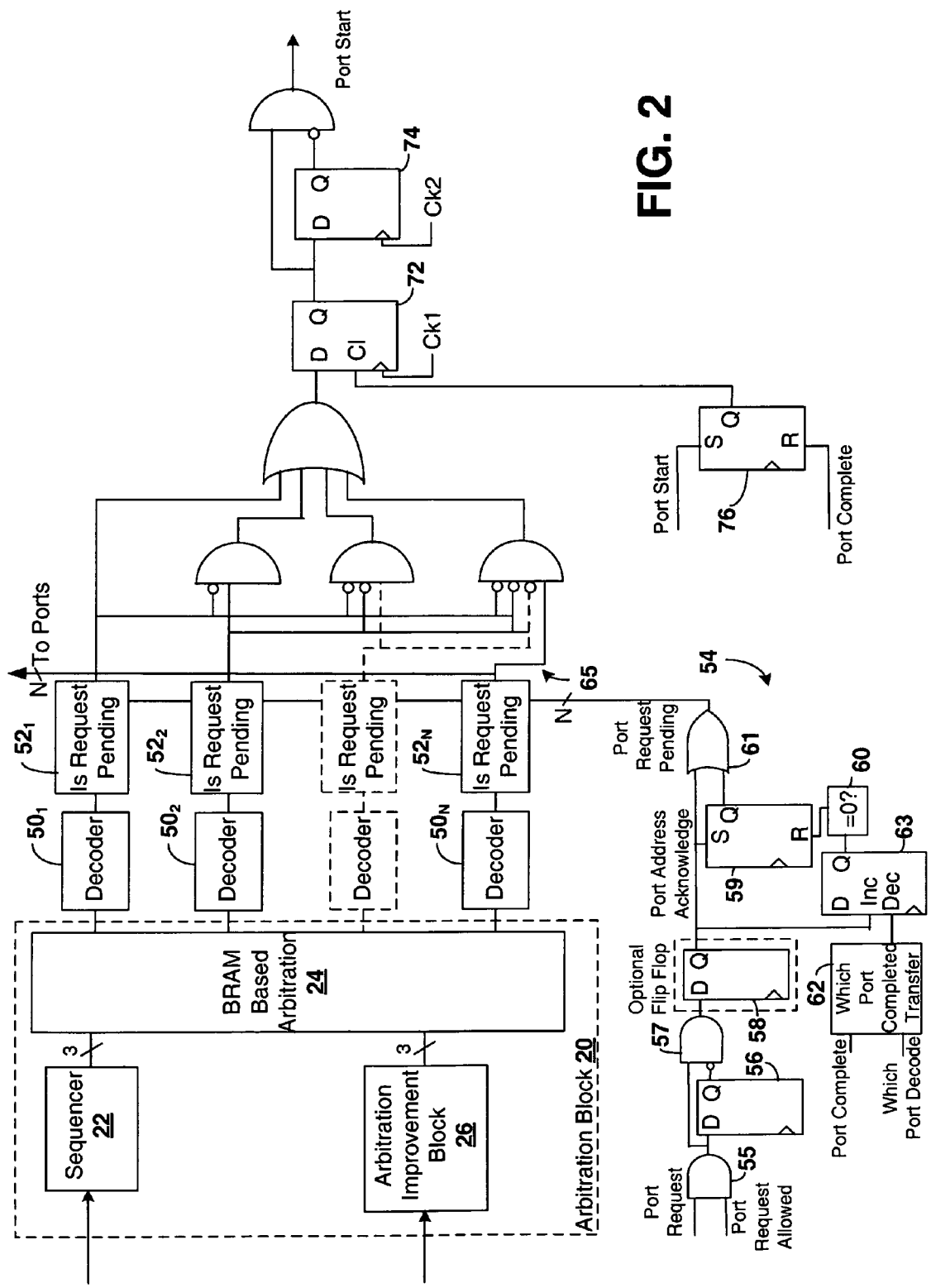
FIG. 2 shows components of the port arbiter of FIG. 1 according to one embodiment of the present invention.

FIG. 2 shows components of the port arbiter 10 as well as the control logic 16 according to one embodiment of the present invention. The arbitration block 20 shows components used in the port arbiter 10 to provide arbitration and an indication of successive ports granted address. The remaining logic outside of arbitration block 20 directs grantor acknowledgement signals for individual ports to transmit data and provides status indications as described in more detail to follow.

Figure 3:
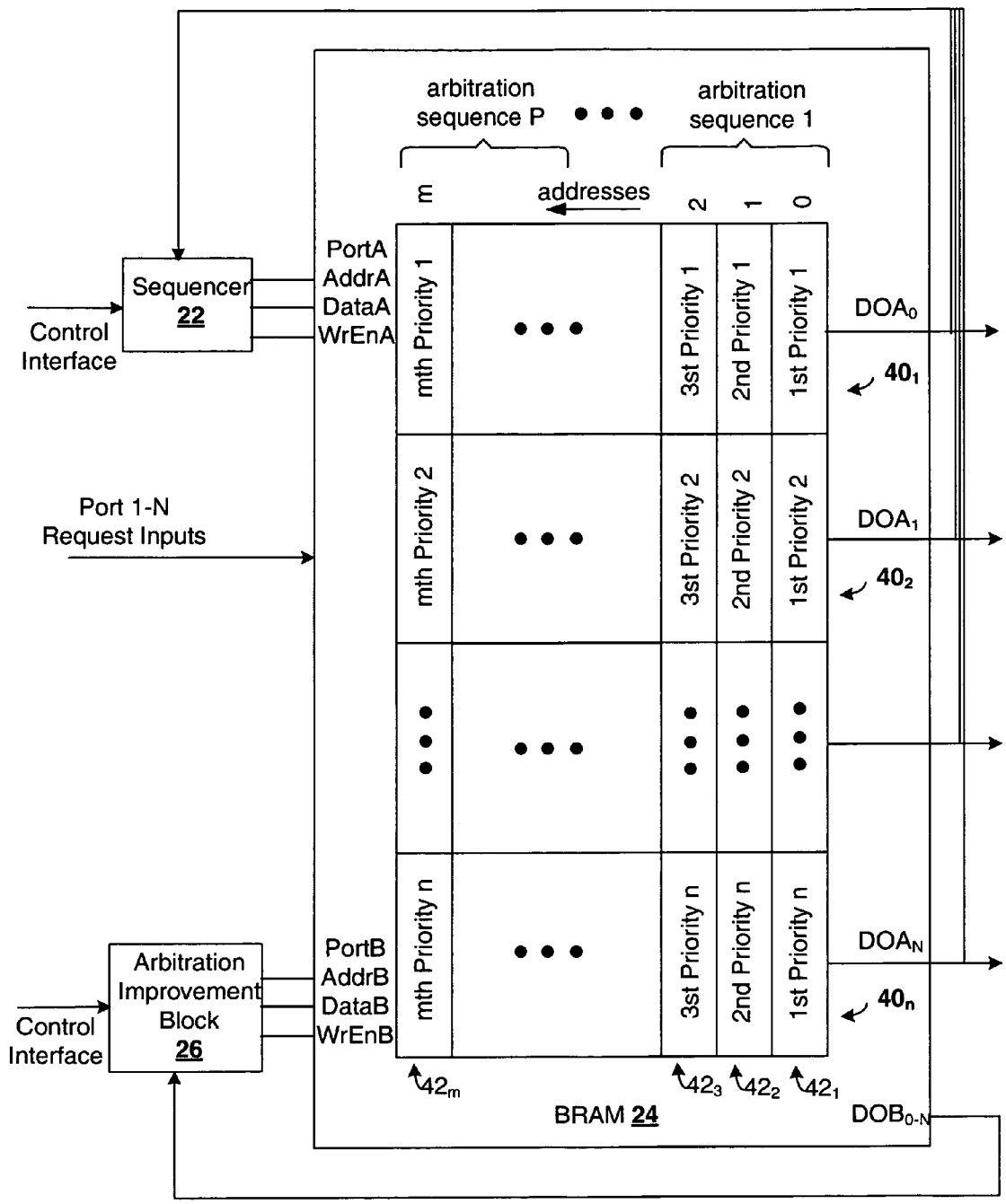
FIG. 3 shows details of components of the arbitration block of FIG. 2.

Details of components of the arbitration block 20 are shown in FIG. 3. A sequencer 22 receives control inputs from a controller, such as a device control register (DCR) bus, used to select an arbitration algorithm. The sequencer 22 will use the algorithm to set the upper bits of the BRAM address and will increment the lower bits of the address each time the complete bit is asserted indicating a grant for a port is provided, or each time an idle bit is asserted indicating no grant is provided from time slots during a clock cycle. With an address change, a different port request will be granted and provided out the data output ports labeled DOA from the BRAM 24. The control interface allows a control processor to change or update the arbitration programs making up the contents of the sequencer 22. Different numbers of arbitration algorithms, or programs can be stored in the BRAM 24 for use by the sequencer. The algorithms can have different lengths.

Requests are provided from the individual ports 1-N directly for storage in the time slots of the BRAM arbiter. The BRAM arbiter 24 stores an indication of ports requesting access in time slots organized according to priority levels. Feedback is provided from the output of the BRAM 24, enabling the sequencer 22 to adapt the arbitration scheme to limit a backup of port requests.

The BRAM 24 may be a dual ported device with the two ports labelled A and B. The sequencer 22 uses port A. An arbitration improvement block 26 is provided to connect to port B. The arbitration improvement block 26 receives feedback from the output of the BRAMs 24 (labeled $DOA_{0-N}$ for data output A and $DOB_{0-N}$ for data output B) to monitor the arbitration scheme used. Inputs to the BRAM 24 for port A include address (AddrA), data (DataA) and write enable (WrEnA), and similar inputs are provided to port B. Should the arbitration scheme need changing because, for example one or more ports have data requests backing up, the arbitration improvement block 26 can alter the arbitration scheme.

The sequencer 22 and the arbitration improvement block 26 are separate and independent. The sequencer is responsible for sequencing through a selected algorithm and changing the algorithm based on a user input. The sequencer 22 may use multiple algorithms, and can select between the different algorithms based on a controller input. The arbitration improvement block 26 is used to modify an algorithm or change particular algorithm used by the sequencer. There are several reasons for modifying or changing a particular algorithm using the arbitration improvement block 26. First, performance targets for the ports may not be met. Second, there may not room in the BRAM to store all of the algorithms a user may desire. Third, a user may wish to monitor and optimize the algorithms, even though targets are met.

The arbitration algorithm is stored in BRAM 24 according to time slots and priority levels. In every time slot there are n priority levels where a particular port is assigned to each priority level. The highest priority port that is requesting access to the memory controller is the port that may be given access to the external device, such as a memory controller. When the port has completed its task the next time slot will be evaluated and another port could be given access to the memory controller. If none of the ports are requesting access to the external device, the arbiter will move on to the next time slot on the next clock cycle.

Looking at the BRAM 24 in FIG. 3, it is observed that the top row $40_1$ represents the first priority, the second row $40_2$ represents the second priority, and the last row $40_n$ represents the n-th priority. The time slots are shown in columns from right to left, where the first time slots $42_1$ are on the far right column and the m-th time slots $42_m$ are shown on the far left column. The addresses for port A of the BRAM correspond to the time slots. Thus address 0 represents the first time slot and address m−1 represents the m-th time slot.

Different arbitration sequences are stored in the BRAM 24, as illustrated by the sequence 1 through sequence P in FIG. 3 serving to group columns of timeslots in the BRAM 24. Sequence 1 includes columns 0-2. Sequence P includes the far left column m as well as other columns. Other sequences occur between sequences 1 and P. Arbitration sequence 1 is shown providing data outputs $DOA_0$-$DOA_N$ from the BRAM 24, although the sequencer 22 can select a different one of the sequences 1-P as the arbitration algorithm to provide the data outputs $DOA_0$-$DOA_N$.

The sequencer 22 will select which of the arbitration algorithms stored in BRAM 24 is desired using an address input for PORT A of the BRAM. The chosen algorithm (one of sequences 1-P) will sequence through the column of time slots for the algorithm linearly (depending on the algorithm). When the sequencer 22 reaches the last column of a particular algorithm, it will be reset back to the beginning column of that algorithm. The sequencer 22 will increment under at least two conditions. First, it will increment if a port has been granted access to the memory controller and has completed all of its tasks. Second, it will increment if no port was granted access for a particular time slot.

As a non-limiting example, assume arbitration is being provided for four ports 1-4. Assume further that the arbitration priority assigned to ports 1-4 is in reverse order, or port 4 has priority 1, port 3 has priority 2, port 2 has priority 3 and port 1 has priority 4. Assume that this arbitration priority is sequence 1 in FIG. 3. Assume further that in timeslot 1 (column $42_1$) ports 1 and 4 have requests, in timeslot 2 (column $42_2$) only port 3 has a request and in timeslot 3 (column $42_3$) only port 2 has a request. With these conditions, in a first clock cycle port 4 has a request in first priority 1 and port 1 has a request in first priority 4. The first data output $DOA_0$ will be for port 4 from first priority 1. In a next clock cycle since the sequence $1^{st}$ priority column still has a request, that request port 1 will be output from $DOA_3$. In a next clock cycle, since no more requests are pending from sequence $1^{st}$ priority, the arbitration sequence will switch to the $2^{nd}$ priority column. In the second priority column, only port 3 has a request stored in $2^{nd}$ priority 2 that will be sent out as $DOA_1$. In a next clock cycle, since no more requests are pending from sequence $2^{nd}$ priority, the arbitration sequence will switch to the $3^{rd}$ priority column. In the $3^{rd}$ priority column, only port 2 has a request stored in $3^{rd}$ priority 3 that will be sent out as $DOA_2$. In a next clock cycle, since no more requests are pending from sequence $3^{rd}$ priority, the algorithm sequence will switch back to the $1^{st}$ priority and the algorithm continues in this manner.

Should the sequencer switch to a different algorithm, a different one of the sequences 1-P will be used. For example, with four ports 1-4, the priority might be changed to a different sequence algorithm (in 1-P) where the port priority is the same as the port number. For such a sequence algorithm port 1 has priority 1, port 2 has priority 2, etc. Arbitration then proceeds with these new priorities in a similar manner to that described previously with the sequence algorithm where the port 1-4 priorities were opposite the port numbers.

BRAMs are fairly large and therefore multiple arbitration algorithms (represented by sequences 1-P in FIG. 3) can be stored in the BRAM. With multiple algorithms, there are several ways to choose which of the arbitration algorithms should be used. First, software can have hooks into the sequencer 22, possibly through a DCR control bus, and choose an algorithm based on what the software knows about how the system will likely behave. This process may have limited results if changes in the software operation can make another algorithm more appropriate. Another option would be to have the software set performance targets and collect feedback to indicate if the targets are met. If not met the software cycles through the various algorithms until an algorithm that meets the performance targets is found.

Figure 4:
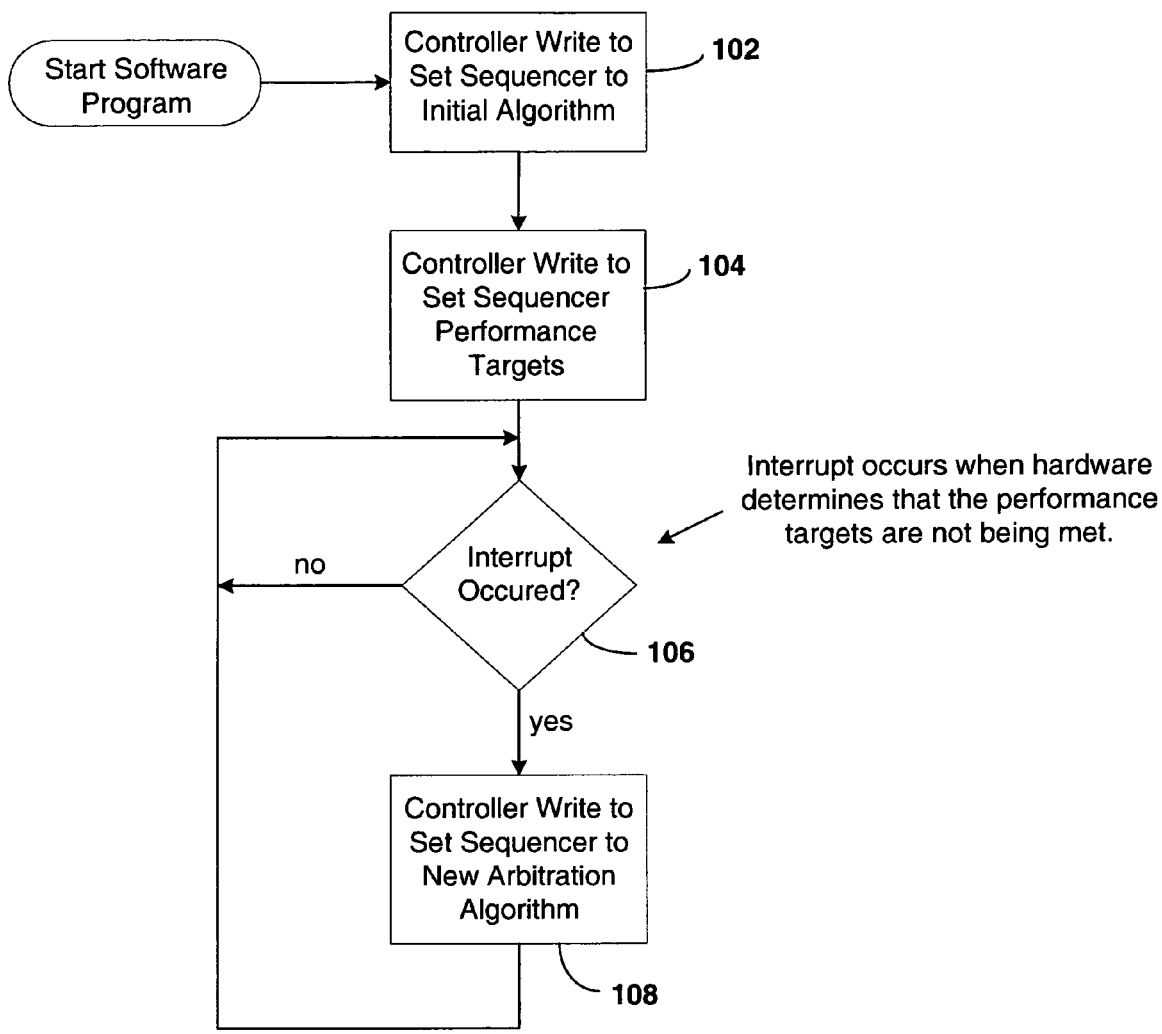
FIG. 4 shows a flow chart illustrating one embodiment of how a controller can access the sequencer of the port arbiter to choose an algorithm.

FIG. 4 provides a simple flow chart illustrating how a controller can access the sequencer 22 to choose an algorithm as detailed to follow. The process of FIG. 4 begins in step 102 where the controller writes to the sequencer an initial algorithm to control the BRAM arbiter. In a step 104, the controller further writes a set of performance targets to the sequencer 22. The sequencer 22 collects feedback from the outputs of the BRAM arbiter 24, as well as information on ports requesting to transfer data and uses the set of performance targets to monitor data flow using the initial algorithm written in step 102. The sequencer 22 generates an interrupt if targets are not met. Thus, in step 106 monitoring for the sequencer interrupt is provided. If the interrupt occurs, then in step 108 a new arbitration algorithm is provided to the sequencer 22 from the controller, and afterward monitoring for an interrupt continues in step 106.

The process of FIG. 4 may be further varied if different types of controllers are sending requests to the ports at different times. With different controllers, the algorithm of FIG. 4 can be modified slightly, or additional steps added to switch between algorithms depending what type controllers are sending requests for data transfer to the ports. A flow chart of this method is shown in FIG. 5 and detailed to follow.

Figure 5:
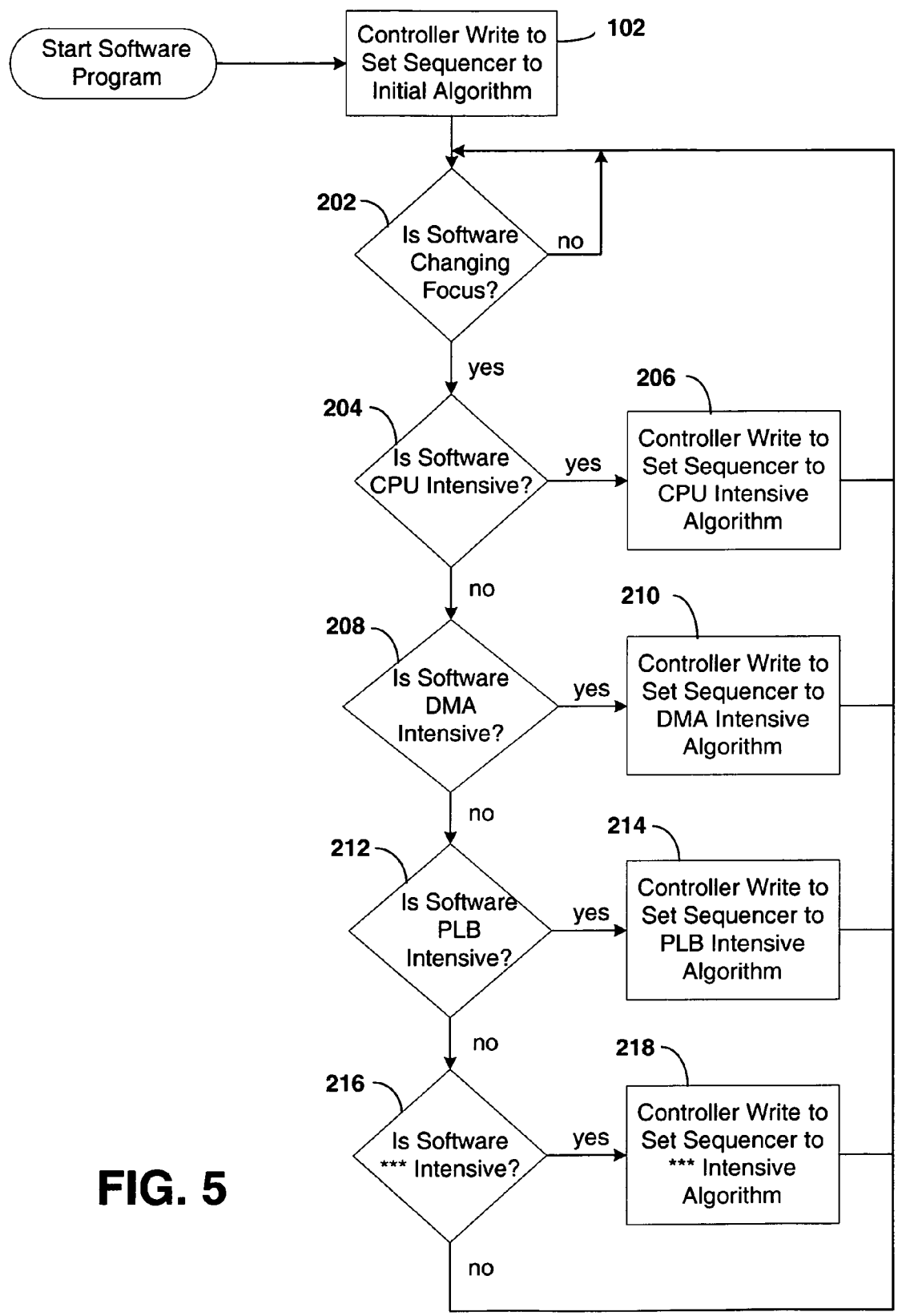
FIG. 5 shows a flow chart illustrating an alternative embodiment of how a controller can assess the sequencer to choose an algorithm based on the type device requesting port access.

The process of FIG. 5 begins in step 102 with the controller writing an initial algorithm to sequencer as in FIG. 4. However, the process diverts from FIG. 4 in step 202 where monitoring is provided to determine if the focus of software operating has changed to different type requesters. Should the focus change as determined in step 202, subsequent steps reset the sequencer 22 with an appropriate arbitration algorithm. In step 204, a determination is made if software is now CPU intensive, and if so a CPU intensive algorithm is loaded to the sequencer in step 206 and monitoring control returns to step 202. If software is not CPU intensive as determined in step 204, control goes to step 208. In step 208, a determination is made if software is now DMA intensive, and if so a DMA intensive algorithm is loaded to the sequencer in step 210 and monitoring control returns to step 202. If software is not DMA intensive as determined in step 208, control goes to step 212. In step 212, a determination is made if software is now PLB intensive, and if so a PLB intensive algorithm is loaded to the sequencer in step 214 and monitoring control returns to step 202. If software is not PLB intensive as determined in step 212, a determination is made if software is now some other device (labeled ***) intensive in step 216. If so, the other device intensive algorithm is loaded in step 218 and control returns to step 202. In this manner other steps may be added to the flow diagram The processes of FIGS. 4 and 5 may have limited results if the ports are behaving atypically during the time that performance metrics are being collected, or if none of the algorithms selectable allow the system to meet performance targets consistently. While both of these options have limitations, the performance is expected to be better than not using these options.

An additional element of the arbitration block of FIGS. 2 and 3 is the arbitration improvement block 26. The arbitration improvement block 26 can be used to dynamically configure the arbitration algorithm either through software or through hardware. Software can provide hooks into the arbitration improvement block 26, using an interface like the DCR Bus. There are several ways to implement the arbitration improvement block 26. One approach is to have software set performance targets, then have hardware monitor the performance of each port. One way to monitor performance is through feedback from the arbiter outputs using port B of the dual ported BRAM as shown. Software could see which ports are meeting the target performance and which ones are not meeting the targets and adjust the arbitration algorithm accordingly until all performance targets are met. Because the arbitration improvement block 26 use Port B of the BRAM, arbitration does not need to halt while the arbitration algorithm is updated.

Figure 6:
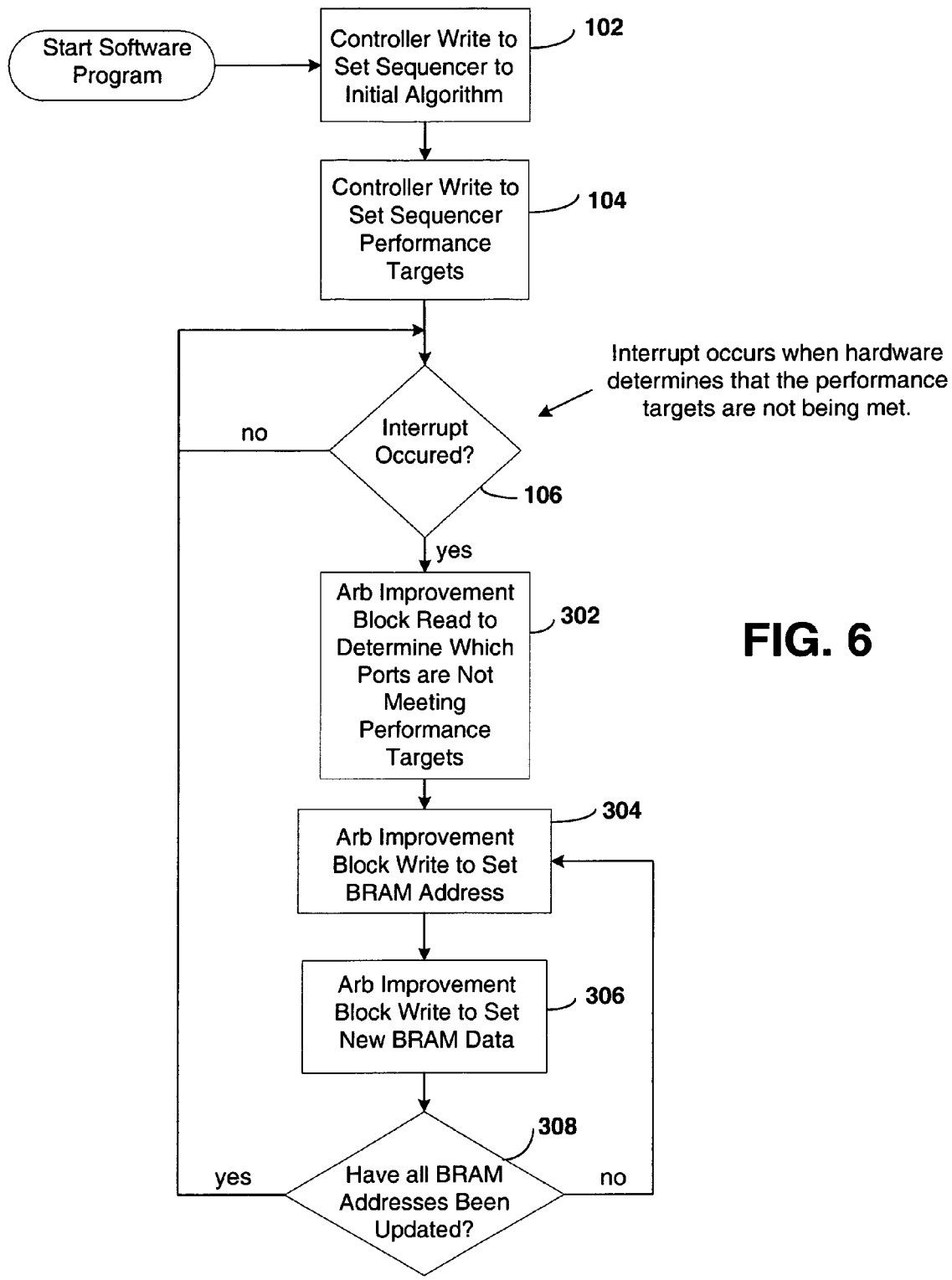
FIG. 6 shows a flow chart illustrating operation of the arbitration improvement block 26.

FIG. 6 shows a flow chart illustrating operation of the arbitration improvement block 26. The process of FIG. 6 begins in step 102 with the controller writing an initial algorithm to the sequencer, and writing a set of arbitration improvement or performance targets in step 104, and determining if an interrupt occurred in step 106 as in FIG. 4. In step 302, the process of FIG. 6 varies from that of FIG. 4 by checking the arbitration improvement block 26 connected to port B to determine which ports are not meeting performance targets, rather than using port A as in the process of FIG. 4 and interrupting the arbitration procedure.

The process of FIG. 6 in steps 304, 306 and 308 continues by writing data to specific BRAM addresses to change the arbitration scheme. In this manner the arbitration scheme itself can be changed to meet specific data flow needs, unlike in the processes of FIGS. 4 and 5 where a completely new algorithm is created. Although shown separately, the processes of FIGS. 4-6 can be combined. The processes of FIGS. 4-6 are intended to be samples processes only and can be combined or modified to provide an optimal solution for a particular application.

The remaining circuitry outside the arbitration block 20 shown in FIG. 2 is the control logic 16. Initially, the decoders $50_1$-$50_N$ decode the time slot data output from the arbitration block 20. Although decoders $50_1$-$50_N$ are shown, depending on the amount of BRAM memory available, encoding and decoding may not be needed.

If encoding is used, at least two ways can be used to represent the port number in the table of time slots stored in the BRAM 24. First, in an example system having 8 ports, the port number could be encoded as "one hot," where each priority stored in BRAM 24 uses 8 bits. Another option is to encode the port number, such as using 3 bits. For example in some embodiments, BRAM 24 may be 18 Kb and may have a 36-bit wide output, There may be 32 arbitration algorithms stored in the BRAM, each of which are 16 time slots long. If three bit encoding is used, when port 3 was in priority 1 it could be stored or encoded either as 0b0000_1000 or 0b011. If port 4 was in priority 1, it could be stored or encoded either as 0b0001_0000 or 0b100. The example implementation shown in FIG. 2 which includes selection logic assumes that BRAMs are limited in the PLD and/or that adding a decoding stage will not impact the maximum clock frequency, and thus a 3-bit encoding option is selected. This means that if 8 priority levels are desired for each time slot, 24 output bits are required. In Virtex-4 FPGAs available from Xilinx, Inc. of San Jose, Calif., BRAMs can have up to 36 outputs. Thus, this example implementation will require only one BRAM. If a "one hot" encoding option were used, 64 output bits would be needed, and thus two BRAMs would be required.

In FIG. 2, the "is request pending" blocks $52_1$-$52_N$ provide a signal indicating whether a port specified by a particular priority level in a particular time slot is requesting arbitration. The is request pending blocks $52_1$-$52_N$, thus, receive port enabling signals from the request pending logic 54 indicating when a request is pending. Although request pending logic 54 is shown alone, one set of logic 54 is provided for each port. The blocks $52_1$-$52_N$ also receive a port number specified by the decoded BRAM arbitration outputs, if decoding is utilized from decoder $50_1$-$50_N$ outputs. The output from the blocks $52_1$-$52_N$ will each be a one bit value indicating whether a particular priority level has a request that is ready for arbitration.

The logic 54 in FIG. 2 indicates when a port request is pending based primarily on a counter 63 that is incremented or decremented by input signals. The counter 63 is decremented when a port transfer is complete. The decrement signal is derived using the port transfer complete indication provided from a circuit 62. The circuit 62 receives a port transmission complete signal and an indication of which port completed transfer of data. The counter 63 is incremented by a signal acknowledging a port request has occurred and that the port request has been allowed based on two inputs to AND gate 55. A pulse making up the increment signal from AND gate 55 is provided through elements 56-58 to the counter 63. The increment signal to counter 63 further provides a set input of an output flip flop 59 and a first input to an OR gate 61 that provides the port request pending signal to blocks $52_1$-$52_N$. The output of the counter 63 drives the reset input of the output flip flop 59 through an equals zero comparator 60. The output flip flop 59 has an output Q providing a second input of the output OR gate 61. The OR gate 61 from each circuit 54 provides an input to a respective one of the Is Request Pending blocks $52_1$-$52_N$.

As a non-limiting example, operation of the logic 54 is described for a port 2 in a group of ports. Initially no port request is pending, so the output of AND gate 55 remains low. No pulse, thus, is provided to flip flop 58 using flip flops 56 and 57 and the set input of register 59 remains low. Port complete has been previously asserted, or asserted at startup to assure the components 62, 63 and 60 have reset flip flop 59 so that its output is low. The output of OR gate 61 is, thus, low and no port request is indicated by logic 54 for port 2.

When port 2 asserts a request and the request is allowed or stored in BRAM 24, the inputs to AND gate 55 go high. A pulse is thus asserted through flip-flop 56 and 57 to flip flop 58. The pulse from flip-flop 58 provides a high to OR gate 61 to provide a port request pending signal for port 2 from gate 61. The pulse also sets the latch 59 so that a high continues to be asserted to an input of OR gate 61 so the port 2 request pending signal continues to be asserted from its output. The pulse also increments the up/down counter 63 so it is triggered to reset latch 59 once a port complete for port 2 is later received. The port 2 request pending signal enables the Is Request Pending circuit $52_2$ to provide an output once the arbiter BRAM 24 provides the port 2 request to its second input. When the port transmission complete signal, as well as an indication that it is port 2 that has completed transmission is received, circuit 62 provides a decrement signal to up/down counter 62. The decrement signal returns up/down counter to 0 to cause circuit 60 to reset the latch 59. This drives both inputs to OR gate 61 low, deasserting the port 2 request pending signal from its output. Circuit 54 for other ports operates in a similar manner.

Additional logic 65 in FIG. 2 receives the output of the request pending indicators $52_1$-$52_N$. The logic 65 generates a port start signal, indicating if a port has been granted access to transmit its data. The port start signal will be a pulse that is used to indicate that a particular port has been granted access. This signal will be asserted with the corresponding port number from the Is Request Pending circuits $52_1$-$52_N$. Arbitration will not be allowed to continue until the port complete signal is asserted.

The logic 65 is a priority decoder. The logic 65 functions so that the highest priority port requesting access to the memory controller will be passed to the flip flops shown at the output of logic 65 to generate the port start signal. In one embodiment, one of the logic circuits 65 is provided for each port. There will be a port start output signal from the logic 65 for only one of the ports. The logic 65 operates so that when multiple ports requests are pending for a timeslot, only the port with the highest priority has a request granted at one time. In an alternative embodiment the logic 65 is not needed if the BRAM arbitration can store enough information to identify and allow one request at a time from each timeslot, the information including the port start signal addressed for a port.

The dual flip flops in logic 65 provide the benefit of allowing output logic 65 to run at a speed of 1×, 2×, 4×, etc with comparison to other circuitry in the arbiter. Thus, two clocks Ck1 and Ck2 are shown driving the flip flops 72 and 74. The clocks Ck1 and Ck2 will be the same frequency if equal operation speed is desired, but their frequencies can be varied as desired. This is important because even though the BRAM approach to arbitration reduces the required logic, there are still quite a few levels of logic between the BRAM and the output flip flops. Without delay provided using the dual flip flops, it can be difficult to meet timing requirements at higher frequencies.

As a nonlimiting example using the logic 65 of FIG. 2, assume that requests from ports during a clock cycle are provided from port 1 over $DOA_0$ and port 3 over $DOA_2$. With this example, port 1 will have priority and logic 65 for port 1 will function to provide a port start signal. Separate logic similar to logic 65 for port 3 will recognize port 1 has priority and not issue a port start signal for port 3. The logic 65 for port 3 will have AND and OR gates with inputs set so that the enabling request for port 1 will disable the port start for port 3. But, when the port 1 request is no longer asserted, the logic 65 for port 3 with a request still pending will generate a port start for port 3.

The output flip-flops 72 and 74 clocked by clk1 and clk2 will pulse the port start signal for the requesting port with priority. Once the port start and a port complete signal are both received to set and reset by latch 76, the latch 76 will clock the next port start signal if the request with highest priority is pending for the corresponding port.

This architecture according to the present invention solves several problems. First, it allows for a very complex arbitration algorithm to be used. Second, it allows for dynamic configurability of the arbitration algorithm without halting the arbiter using the arbitration improvement block as described above. Third, it can significantly reduce the arbitration latency compared to a similar arbiter that uses logic as opposed to memory to perform the arbitration. Fourth, by using memory rather than logic, it takes advantage of PLD resources that would otherwise be wasted and frees up resources to be used by other components of the system.

Although the present invention has been described above with particularity, this was merely to teach one of ordinary skill in the art how to make and use the invention. Many additional modifications will fall within the scope of the invention, as that scope is defined by the following claims.

What is claimed is:

1. An integrated circuit (IC) having components configurable to provide an arbiter, the IC comprising:
   a memory provided on the IC, the memory including storage space divided into time slots,
   wherein the memory stores a plurality of arbitration algorithms, each arbitration algorithm including at least one time slot;
   a plurality of input ports for receiving requests for access to an external peripheral,
   wherein the requests are provided from the input ports to the memory, and
   wherein each time slot stores priority levels corresponding to the input ports for implementing a portion of the arbitration algorithms, wherein each time slot specifies a list of input ports having a request for that time slot, wherein the list is ordered according to priority level of the input ports; and
   a sequencer for selecting a first arbitration algorithm from the plurality of arbitration algorithms.

2. The IC of claim 1, wherein the sequencer comprises at least one input for selecting a second algorithm from the plurality of algorithms.

3. The IC of claim 1, wherein the sequencer monitors the performance of the input ports, and
   wherein the sequencer changes the first arbitration algorithm used by the sequencer to a second arbitration algorithm when the performance of at least one input port falls below a predetermined value, wherein performance depends upon a number of pending requests detected upon at least one of the plurality of input ports.

4. The IC of claim 1, further comprising:
   an arbitration improvement block for modifying at least one time slot based operation parameters of the arbiter.

5. The IC of claim 1, further comprising:
   an arbitration improvement block for monitoring the performance of the input ports, the arbitration improvement block modifying the first arbitration algorithm when the performance of at least one input port falls below a predetermined value, wherein performance depends upon whether at least one request is pending upon each input port.

6. The IC of claim 1, wherein the sequencer increments to a next time slot under one of two conditions comprising:
   when each port that has a request in a current time slot is granted access to the peripheral device and has completed all its tasks; and
   when no port has been granted access in a particular time slot.

7. The IC of claim 1, wherein the first arbitration algorithm used by the arbiter has port numbers corresponding to ones of the input ports stored in the time slots of the memory.

8. The IC of claim 1, wherein the sequencer includes an input port for providing a signal to select one of the algorithms to use as the first arbitration algorithm.

9. The IC of claim 1, further comprising output logic, the output logic for generating a pulse indicating a port has been given access to the peripheral device and a signal indicating which port has been given access to the peripheral device.

10. The IC of claim 9, further comprising:
    flip flops providing a time controlled output from the output logic.

11. A method of arbitrating access to a peripheral device using an integrated circuit (IC) comprising:
    providing requests to transmit data from ports to time slots in a BRAM memory array; and
    arbitrating to arrange the requests in the time slots of the BRAM according to priority levels assigned to the ports, wherein each time slot stores priority levels corresponding to the input ports for implementing a portion of the arbitration algorithms, wherein each time slot specifies a list of input ports having a request for that time slot, wherein the list is ordered according to priority level of the input ports.

12. The method of claim 11, further comprising:
    changing arbitration schemes used to perform the step of arbitrating.

13. The method of claim 12, further comprising:
    monitoring the rate of flow data from each port, and comparing the respective rates from each port with a target rate; and
    selecting a particular one of the arbitrations to perform the step of arbitrating depending on the rate of flow from at least one of the ports.

14. The method of claim 11, further comprising:
    selecting a particular one of the arbitrations to perform the step of arbitrating depending on a user provided input.

15. The method of claim 11, further comprising:
    indicating when a port has been given access to the peripheral device.

16. An integrated circuit (IC) having components configurable to provide an arbiter, the IC comprising:
    means for storing arbitration requests in the IC, the means for storing including memory space divided into time slots; and
    input ports for receiving requests for access to an external peripheral, wherein the requests are provided from the input ports to the means for storing, and wherein each of the input ports is assigned to a priority level so that the requests from the respective port will be provided in a time slot receiving requests to identify the priority,
    wherein each time slot stores priority levels corresponding to the input ports for implementing a portion of the arbitration algorithms, wherein each time slot specifies a list of input ports having a request for that time slot, wherein the list is ordered according to priority level of the input ports.

17. The IC of claim 16, further comprising
    a means for providing arbitration algorithms for setting the order of port requests to be stored in a BRAM memory to be granted access to the peripheral; and
    a means for choosing one of the algorithms to incrementally provide requests from each one of the time slots to the peripheral device.

18. The IC of claim 1, wherein the memory operates at a different frequency than other portions of the IC.

19. The IC of claim 1, wherein the plurality of arbitration algorithms are concurrently used in regulating access to the external peripheral.

20. The IC of claim 1, wherein the sequencer monitors the input ports and identifies a type of each controller issuing the request for access to the external peripheral, wherein an arbitration algorithm from the plurality of arbitration algorithms is selected according to the types of controllers identified.

* * * * *